Oct. 21, 1969 R. LUCIEN 3,474,313
ALTERNATING-CURRENT TORQUE MOTORS
Filed Dec. 1, 1967 2 Sheets-Sheet 2

United States Patent Office 3,474,313
Patented Oct. 21, 1969

3,474,313
ALTERNATING-CURRENT TORQUE MOTORS
Rene Lucien, Neuilly-sur-Seine, France, assignor to Societe Anonyme dite Messier, Paris, France
Filed Dec. 1, 1967, Ser. No. 687,202
Claims priority, application France, Dec. 8, 1966, 86,756
Int. Cl. H02p 5/28, 7/36
U.S. Cl. 318—123                                9 Claims

ABSTRACT OF THE DISCLOSURE

Alternating-current magnetic motors, especially for controlling electro-hydraulic distributors, in which the permanent magnets of conventional motors are replaced by polarizing coils coupled in series and supplied with alternating current at constant frequency and amplitude, the control coils, also in series, being transversed by an alternating control current having a frequency strictly identical with that of the polarizing current while the amplitude or the phase of said control current is modulated. The invention contemplates improved constructions of torque-motors and force-motors of the kind referred to, in which any alternating component of the torque or force produced is eliminated, in order to give stability of operation, by a special form of construction of the torque-motor armature and the force-motor core, and by designing the moving systems in such manner that their natural oscillation frequency is substantially less than that of the alternating component of the torque or force generated.

---

Figure 1:
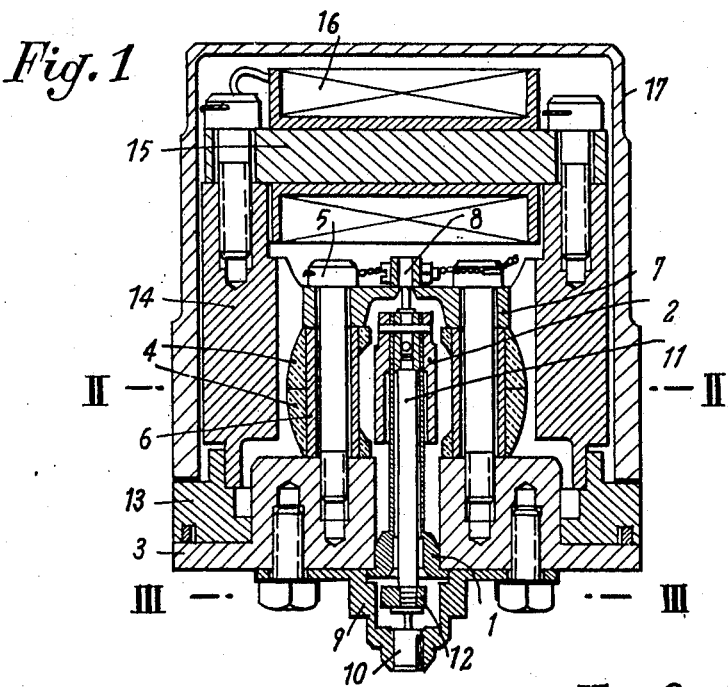

The present invention relates to an alternating-current magnetic motor intended particularly but not exclusively for the control of an electro-hydraulic servo-distributor.

The principle of direct-current magnetic motors of the type known as "force-motors" and "torque-motors" is well known. Their function is to supply a force (linear-motor) or a torque (rotary-motor) as a function of an electric control signal.

In the majority of applications, the magnetic polarizing flux is created by a permanent magnet. As regards the control flux, this is created by one or a number of windings through which passes a direct current.

In certain applications, it is however necessary that a fault in the control amplifier or in one of the control windings (for example a failure due to a broken wire) should not result in unbalance of the magnetic motor. It may in fact be very desirable that these faults should only result in the return or the maintenance of the motor to or at its position of equilibrium (neutral position of the moving armature). The risk of failure inherent in the control windings can be eliminated by utilizing only one, or a number in series, which is valid both for alternating current and for direct current, but there remains the risk of an accidental unbalance of the direct-current amplifier. In fact, a fault occurring in the amplifier may very well generate at its output a direct-current voltage which unbalances it completely, and which will thus originate a maximum torque or maximum force at the motor output.

In order to find a remedy for these drawbacks, the Applicant has proposed, in French Patent No. 1,473,957 to control the magnetic motors by an alternating current instead of a direct current and to replace the permanent magnets of known motors by a polarizing winding supplied with alternating current at constant frequency and amplitude.

The alternating-current magnetic motor, described in the above-mentioned patent, thus comprises one or a number of polarizing windings in series, traversed by an alternating current of constant frequency and amplitude, and one or a number of control windings in series, traversed by an alternating current, the frequency of which is absolutely identical with that of the polarizing current, and the amplitude or the phase of which is modulated.

The present invention has for its object improvements in magnetic motors of this type—force motors or torque motors—with the object of applying them to the control of a hydraulic servo-distributor.

In fact, although the application of motors of this type to the control by all-or-nothing of two mechanical members, for example clapper valves, has already been studied and described in detail, in particular in U.S. Patent No. 3,031,847, the utilization of these motors in the case where the torque or the force which they apply must have a progressive and controlled effect, present serious problems of stability.

Thus, when a torque motor is combined with a hydraulic potentiometer, there must be obtained a differential pressure which is directly proportional to the electric current passing through the control coil of the motor, and it is therefore necessary to eliminate any alternating component of the torque produced in order to obtain perfect stability of operation, which assumes a particular form of the magnetic armature of the motor.

In consequence, the invention has for its object an alternating-current magnetic torque motor of the kind referred to above, intended for electro-hydraulic servo-control systems, characterized in that the device operated by the motor, e.g. a hydraulic vane, is carried by a shaft coupled to an armature which is pivotally mounted with respect to a fixed plate, two control coils electrically connected in series being arranged on each side of this armature, two magnetic poles carried by the said plate supporting a core around which is arranged a polarizing coil.

The invention also relates to an alternating current magnetic force motor of the type referred to above, intended for electro-hydraulic servo-control systems, characterized in that it comprises a core, transversely centered with respect to two pole-pieces, for example by flexible diaphragms, and returned longitudinally to the neutral position by elastic means, for example by springs, a control coil being arranged between the pole-pieces, and polarizing coils being carried by elements which close the magnetic circuit.

Other characteristic features and advantages of the invention will become apparent from the description which follows below of two forms of construction of motors of this type, described by way of non-limitative examples.

Figure 3:
Figure 2:
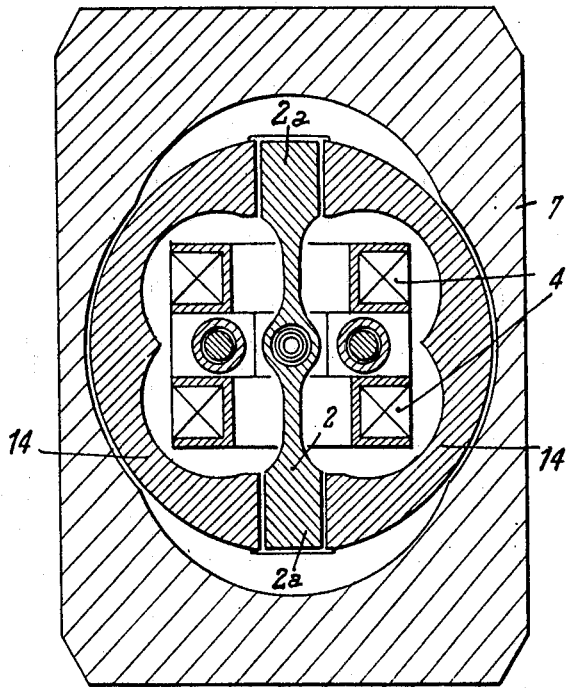
Figure 4:
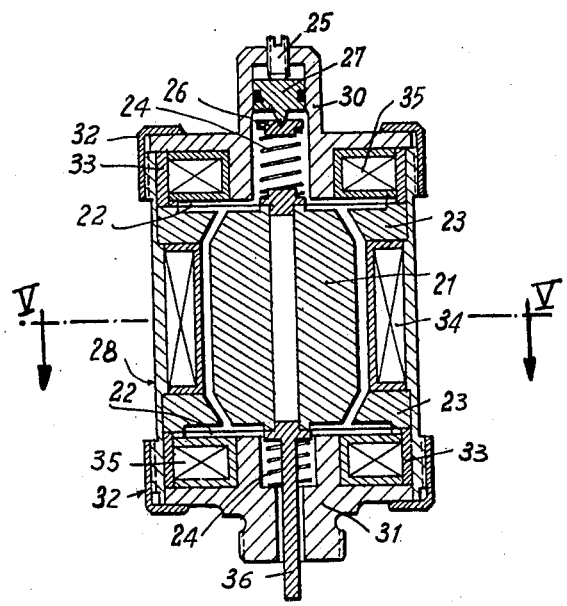
Figure 5:
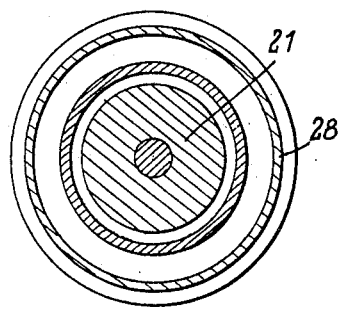

In this description, reference will be made to the accompanying drawing, given by way of non-limitative example. In the drawing:

FIG. 1 is an axial section of the torque-motor;
FIG. 2 is a transverse section, taken along line II—II of FIG. 1;
FIG. 3 is a partial section taken along line III—III of FIG. 1;
FIG 4 is an axial section of the force-motor; and
FIG. 5 is a transverse section taken along line V—V of FIG. 4.

The torque-motor shown in FIGS. 1 to 3 is more particularly designed for the purpose of its application to an electro-hydraulic servo-control system and to the control of the primary stage of an electro-hydraulic servo-distributor having one or two stages.

Fluid-tightness between the first hydraulic stage and the magnetic circuit is ensured by a torsion tube 1. An armature 2 is fixed to one of the extremities of this tube, the other extremity being force fit in a supporting plate 3. The tube 1 also ensures the return of the armature 2 to the neutral point.

Control coils 4, electrically connected in series, are fixed on the plate 3 by two screws 5 which clamp two spacing members 6 and a bridge member 7.

In the bridge member 7 is engaged one of the extremities of a pivot 8, the other extremity being rigidly fixed to the armature 2. At the lower part of the plate 3 is mounted a stirrup support 9 which receives one of the extremities of a pivot 10, the other extremity of which is fixed to a shaft 11, the latter being coupled in turn to the armature 2 and to the upper extremity of the tube 1. On the shaft 11, in the vicinity of the pivot 10, is fixed the hydraulic vane 12, on which the magnetic motor is to apply a torque. The purpose of the pivots 8 and 10 is to ensure the insensitivity of the motor to transverse forces on the system formed by the armature 2 and the vane 12.

On the supporting plate 3 is centered a plate 13 which carries the magnetic poles 14 of the motor. The core 15 is fixed on the upper part of these poles. Around this core is mounted a polarizing coil 16. A cap 17 covers all of these elements.

The polarizing coil 16 is supplied by alternating current of constant frequency and amplitude, while the control coils 4 are traversed by an alternating current, the frequency of which is absolutely identical with that of the polarizing current and the amplitude or the phase of which is modulated.

The operation of this torque-motor is conventional, and has already been described, in particular in the previously mentioned French patent. It will be recalled that a torque motor corresponding to the above description and in which the windings are traversed by alternating currents of the same frequency, supplies a torque which is the sum of a continuous torque and an alternating torque of amplitude equal to the value of the continuous torque. While in many applications of alternating-current magnetic motors, it is advantageous to superimpose on the input signals a so-called "hummer" signal, which minimizes the friction effects, in the present application on the other hand, the amplitude of this hummer signal need only be a very small fraction of the continuous component, and it is necessary to eliminate the effect of the alternating torque.

In order to obtain this result, the armature 2 has a particular shape which forms one of the characteristic features of the invention. It comprises splayed out portions 2a at its extremities so as to increase its inertia to torsion, in order that the natural frequency of the vane 12 associated with the tube 1 may be less than the frequency of the alternating component of the torque produced by the motor. Thus, in one form of construction of this torque-motor which has been perfected by the applicant, the natural torsion frequency of the system formed by the tube 1 and the armature 2 has been made equal to one-quarter of the frequency of the alternating torque, resulting in a reduction in amplitude of about 0.07.

The force-motor shown in FIGS. 4 and 5 is also intended for controlling the primary stage of an electro-hydraulic servo-distributor with two stages, of a distributor with a single stage or of any other mechanical member.

A core 21 is centered transversely by two flexible metal diaphragms 22 with respect to the conical air-gaps which it forms with two pole-pieces 23. It is returned longitudinally into position by two springs 24. In the absence of current, the equality of the air-gaps is obtained by acting on a screw 25 which moves a cup 26 through the intermediary of a cylindrical sliding member 27.

The magnetic circuit is completed by a cylindrical body 28, an upper extremity 30 and a lower extremity 31. Two nuts 32 fix the extremities 30 and 31 on the body 28. Two spacing rings 33 clamp the pole-pieces 23 between the extremities and the body 28. A control coil 34 is arranged between the two pole-pieces 23 and polarizing coils 35 are mounted on the extremities 30 and 31. On the end of the core 21 is fixed the rod 36 on which the magnetic motor exerts a force.

As in the torque-motor previously described, the polarizing coils are supplied with alternating current of constant frequency and amplitude, while the control coil is traversed by an alternating current, the frequency of which is absolutely identical with that of the polarizing current, and the amplitude or the phase of which is modulated.

This motor operates in the conventional manner described in the above-mentioned French patent.

In order to reduce the effect of the alternating torque to an acceptable value, it is clear that it is only necessary to make a suitable choice of the mass of the core 21 and the strength of the springs 24, that is to say the frequency of the system which they constitute.

What I claim is:

1. A magnetic torque-motor intended for controlling an electro-hydraulic servo-distributor, said motor comprising: a supporting plate, two magnetic pole pieces resting on said supporting plate, a core carried by said magnetic pole pieces, a polarizing coil disposed, around said core, control coils carried by said supporting plate, said polarizing coil being supplied by an alternating current of constant frequency and amplitude while said control coil is supplied by an alternating current, the frequency of which is absolutely identical with that of the polarizing current and of which the amplitude or the phase is modulated; a shaft pivotally mounted with respect to said supporting plate, said shaft being arranged between said control coils, a hydraulic vane carried by said shaft and constituting the member driven by said motor, and a metallic armature coupled to said shaft and pivotally mounted with respect to said supporting plate, said armature comprising portions splayed-out on each side of said shaft so as to increase its inertia to torsion.

2. A torque-motor as claimed in claim 1, in which said shaft is articulated at one extremity on said supporting plate by a first pivot means and at its other extremity on an element rigidly fixed to said supporting plate by a second pivot means, so as to ensure the insensitivity of said armature and said hydraulic vane to transverse forces.

3. A torque-motor as claimed in claim 1, in which said armature is articulated on said supporting plate by a torsion tube coaxial with said shaft.

4. A torque-motor as claimed in claim 1, in which said armature is articulated on said supporting plate by a torsion tube coaxial with said shaft, said torsion tube forming a fluid-tight separation between said torque motor and the electro-hydraulic servo-control element actuated by said motor.

5. An alternating-current magnetic force-motor intended for controlling a hydraulic servo-distributor with one or two stages, said motor comprising a core rigidly fixed to the member to be driven, two pole-pieces, means for centering transversely said pole-pieces with respect to said core, a cylindrical metallic body disposed concentrically with said one, two metal parts partially closing said cylindrical body at each of its extremities, said parts being rigidly fixed to said body, a control coil arranged between said pole-pieces, two polarizing coils respectively fixed to said parts closing said cylindrical body, said polarizing coils being supplied by alternating current of constant frequency and amplitude, while said control coil is traversed by an alternating current the frequency of which is absolutely identical with that of the polarizing current, and elastic means for returning said core to its neutral position with respect to said control coil, the mass of said core and said elastic means being chosen in such manner that the natural frequency of oscillation of said core and said elastic means is less than the frequency of the alternating torque of said motor.

6. A magnetic force-motor as claimed in claim 5, in which said elastic means is supported against a cup adjustable in position with respect to one of said parts which partly close said cylindrical body.

7. A magnetic force-motor as claimed in claim 6, in which said elastic means is supported against a cup adjustable in position with respect to one of said parts partially closing said cylindrical body, by means of a screw controlling the displacement of said cup through the intermediary of a sliding member.

8. A magnetic force-motor as claimed in claim 5, in which said means for transversely centering said pole-pieces with respect to said cores comprises flexible diaphragms.

9. A magnetic force-motor as claimed in claim 5, in which said elastic means comprises a spring supported against one extremity of said core.

References Cited

UNITED STATES PATENTS

| | | | |
|---|---|---|---|
| 2,859,391 | 11/1958 | Ericson | 335—266 X |
| 2,891,181 | 6/1959 | Atchley | 310—38 X |
| 2,905,871 | 9/1959 | Martin | 310—36 X |
| 2,939,055 | 5/1960 | Gebhart | 310—29 X |
| 3,001,115 | 9/1961 | Gendreu et al. | 335—266 |
| 3,169,215 | 2/1965 | Bliss | 251—137 X |

MILTON O. HIRSHFIELD, Primary Examiner

D. F. DUGGAN, Assistant Examiner

U.S. Cl. X.R.

251—137; 310—36; 335—268